A. E. YAGER.
AUTO STEERING DEVICE.
APPLICATION FILED AUG. 31, 1915.

1,193,331.

Patented Aug. 1, 1916.
2 SHEETS—SHEET 1.

Witnesses

Inventor
Albert E. Yager.
By
his Attorneys

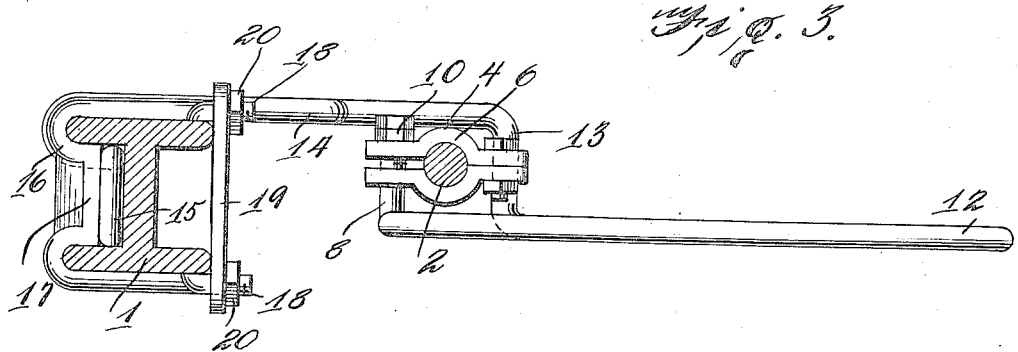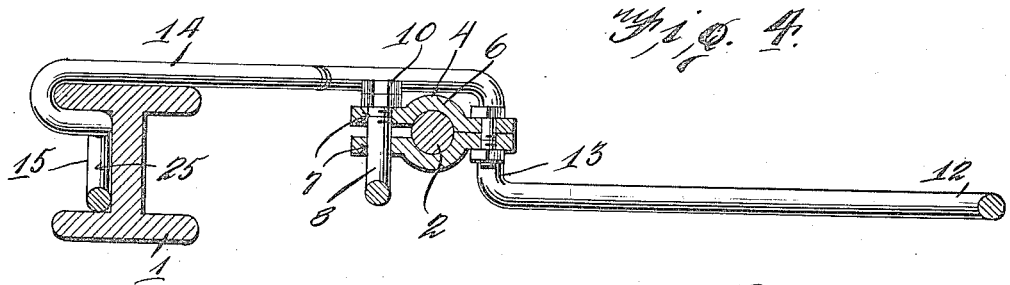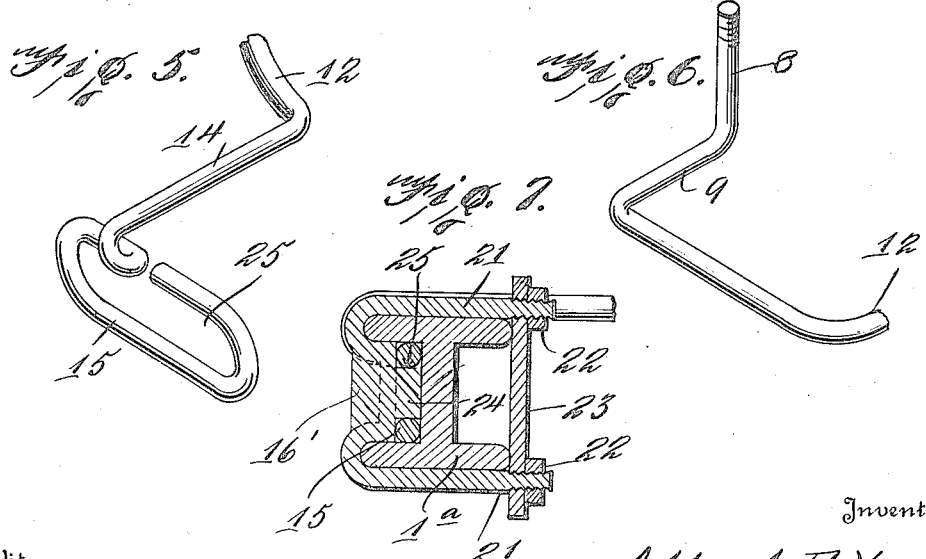

UNITED STATES PATENT OFFICE.

ALBERT E. YAGER, OF LEMMON, SOUTH DAKOTA.

AUTO STEERING DEVICE.

1,193,331.  Specification of Letters Patent.  Patented Aug. 1, 1916.

Application filed August 31, 1915. Serial No. 48,246.

*To all whom it may concern:*

Be it known that I, ALBERT E. YAGER, a citizen of the United States of America, residing at Lemmon, in the county of Perkins and State of South Dakota, have invented certain new and useful Improvements in Auto Steering Devices, of which the following is a specification, reference being had therein to the accompanying drawings.

This invention relates to a safety steering device for automobiles or other motor cars and has for its object the production of a simple and efficient means for enabling an automobile or other vehicle to hold straight course without assistance of the driver.

Another object of this invention is the production of a simple and efficient means for attaching the steering rod to the front axle of a motor vehicle so as to prevent the steering rod from accidentally shifting, should the driver of the car have his hand off of the steering wheel.

A still further object of this invention is the production of a simple and efficient safety steering device which is capable of attachment to any form of motor vehicle without departing from the spirit of the invention.

With these and other objects in view, this invention consists of certain novel combinations, constructions, and arrangements of parts as will be hereinafter fully described and claimed.

Figure 1:
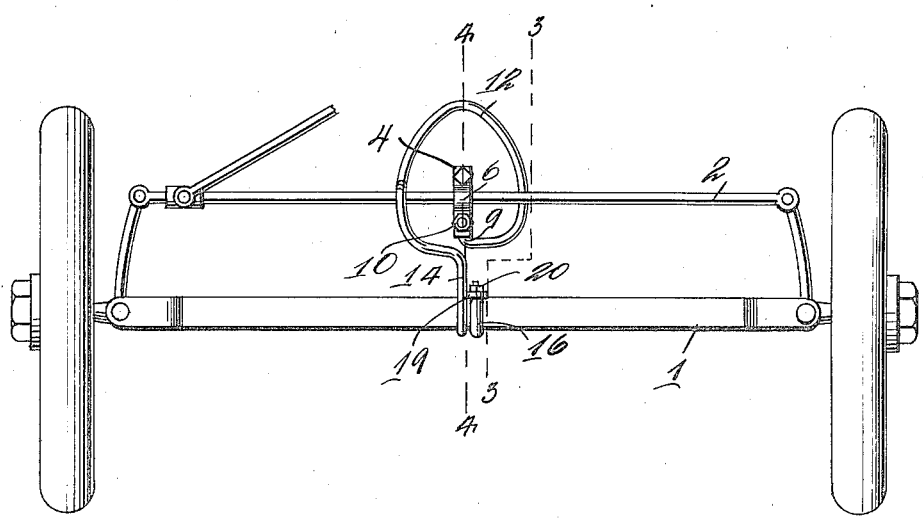
Figure 2:
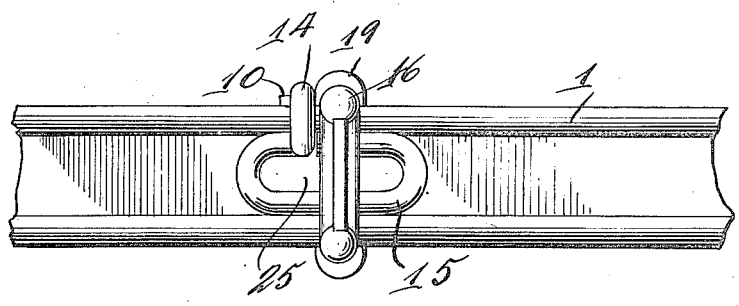

In the accompanying drawings:—Figure 1 is a top plan view of the forward truck of a motor vehicle, showing the steering device applied thereto. Fig. 2 is a front elevation of a portion of the front axle showing the manner of connecting the safety spring thereto. Fig. 3 is a section taken on line 3—3 of Fig. 1, certain parts being eliminated, showing the manner of attaching the spring to the front axle and steering rod. Fig. 4 is a section taken on line 4—4 of Fig. 1. Fig. 5 is a detailed perspective of one end of the safety spring which is adapted to engage the front axle of a motor vehicle. Fig. 6 is a detailed perspective of the opposite end of the safety spring. Fig. 7 is a vertical section through a modified form of clamp used to connect the safety spring to the front axle of an automobile.

Referring to the accompanying drawings by numerals it will be seen that 1 designates the front axle and 2 designates the steering rod of the usual construction employed upon the "Ford" cars. A clamp 4 is secured to the steering rod 2 as illustrated in Figs. 1 and 3 of the drawings and this clamp comprises a pair of jaws 6, having apertures 7 formed therein, through which apertures 7 passes the upwardly extending threaded end 8 of the safety spring 9. A nut 10 is threaded upon the rear end of the safety spring 9 for firmly attaching the upwardly extending end 8 of the safety spring 9 to the clamp 4 and within the aperture 7 thereof.

The safety spring 9 is provided with a rearwardly extending loop 12, one end of which terminates in the upwardly extending end 8, previously referred to. This rearwardly extending loop portion 12 is provided with an upwardly extending portion 13, which upwardly extending portion 13 terminates in a forwardly extending end 14. This forwardly extending end 14 is bent downwardly to conform to the contour of the forward axle 1 and fit snugly over the top flange of the axle 1. The forward end 14 of the safety spring 9 is then bent to constitute a right angularly extending loop portion 15, which loop portion 15 fits snugly against the front face of the axle 1 as illustrated in Fig. 2. A clamp 16 straddles the forward axle 1 and this clamp 16 is provided with an inwardly extending body portion 17 for clamping firmly against the loop portion 15 of the forwardly extending end 14 comprising a portion of the spring 9. This clamp 16 is provided with a pair of rearwardly extending threaded ends 18 over which fits a clamping plate 19 and the nuts 20 are threaded upon these ends 18 for firmly holding the plate 19 in clamped engagement with the axle 1 and also for firmly holding the forward end of the safety spring 9 in engagement with the front axle of an automobile or other vehicle.

In Fig. 7 there is shown an embodiment of the invention—that is to say, an embodiment of the clamp—which is used for connecting the forward end of the spring 9 to the front axle of an automobile. By carefully considering Fig. 7 it will be seen that Fig. 7 shows the clamp 16' provided with the usual rearwardly extending threaded ends 21 carrying the nuts 22 for clamping the plate 23 and clamp 16' in engagement with the front axle 1ª. In the structure shown in Fig. 7, the clamp 16' is provided with an inwardly extending lug 24 adapted to fit in the socket 25 of the loop portion 15 comprising a portion of the forward end 14 of the spring 9, thereby permitting the loop portion 15 to be rigidly attached to the front axle 1 of the automobile.

From the foregoing description, it will be seen that a very simple and efficient means has been produced for preventing the accidental turning or twisting of the front steering wheels of a motor vehicle, and that the spring 9 will efficiently hold the steering wheels upon a true course and will not permit the wheels to accidentally twist, should the motor vehicle accidentally run into a hole or other depression in a roadway. It should, however, be understood that by the operation of the steering mechanism of the usual construction, the steering rod 2 may be shifted for the purpose of changing the course of travel of the motor vehicle.

What I claim is:—

1. The combination with an axle of a vehicle having a longitudinally extending channel upon the front face thereof, of a safety spring provided with a forwardly extending end having a depending loop formed upon the outer extremity thereof, said loop being elongated and adapted to fit in the channel of the front face of said axle, a clamp for clamping said loop against forward movement with respect to said axle, a steering rod, said clamp provided with an inwardly extending lug for fitting within said first mentioned loop and holding said loop in detachable engagement with said axle, said safety spring provided with a rearwardly extending loop portion of material size projecting in the rear of said steering rod and being secured at one end to said steering rod in detachable engagement with said axle.

2. The combination with an axle of a vehicle having a longitudinally extending channel upon the front face thereof, of a safety spring provided with a forwardly extending end having a depending loop formed upon the outer extremity thereof, said loop being elongated and extending longitudinally of said axle and adapted to fit in the channel of the front face of said axle, a removable clamp for clamping said loop firmly against the front face of said axle and holding said loop against forward movement with respect to said axle and also holding said loop against twisting, a steering rod, said safety spring provided with a rearwardly extending loop portion projecting in the rear of said steering rod and being secured at one end to said steering rod in detachable engagement with said axle.

In testimony whereof I hereunto affix my signature.

ALBERT E. YAGER.